(12) United States Patent
Andrei et al.

(10) Patent No.: US 9,533,370 B2
(45) Date of Patent: Jan. 3, 2017

(54) METHOD FOR LASER MARKING AN ANODIZED METAL SURFACE WITH A DESIRED COLOUR

(71) Applicant: SPI Lasers UK Limited, Southampton (GB)

(72) Inventors: Horia Sorin Andrei, Berlin (DE); Paul Martin Harrison, Salisbury (GB)

(73) Assignee: SPI Lasers UK Limited, Southampton (GB)

( * ) Notice: Subject to any disclaimer, the term of this patent is extended or adjusted under 35 U.S.C. 154(b) by 0 days.

(21) Appl. No.: 15/036,967

(22) PCT Filed: Dec. 1, 2014

(86) PCT No.: PCT/GB2014/000497
§ 371 (c)(1),
(2) Date: May 16, 2016

(87) PCT Pub. No.: WO2015/082869
PCT Pub. Date: Jun. 11, 2015

(65) Prior Publication Data
US 2016/0256955 A1  Sep. 8, 2016

(30) Foreign Application Priority Data
Dec. 3, 2013  (GB) .................................. 1321322.8

(51) Int. Cl.
*B23K 26/00* (2014.01)
*B41M 5/26* (2006.01)
(Continued)

(52) U.S. Cl.
CPC ....... *B23K 26/0063* (2013.01); *B23K 26/0006* (2013.01); *B23K 26/0622* (2015.10);
(Continued)

(58) Field of Classification Search
CPC ............... B41J 2/435; B41J 2/442; B41J 2/47; B41J 3/413; B41M 5/262; B23K 26/0063; B23K 26/0643; B23K 26/0648; B23K 26/0006; B23K 26/0622; B23K 26/082
See application file for complete search history.

(56) References Cited

U.S. PATENT DOCUMENTS

2006/0103719 A1* 5/2006 Katzir ...................... B41J 2/442
347/239
2007/0285492 A1* 12/2007 Lund ....................... B41J 2/442
347/246
(Continued)

FOREIGN PATENT DOCUMENTS

WO  2012121732 A1  8/2011

*Primary Examiner* — Kristal Feggins
(74) *Attorney, Agent, or Firm* — Iandiorio Teska & Coleman, LLP (57) ABSTRACT

A method for laser marking an anodized metal surface (5) with a desired color, which method comprises: providing a laser (1) for emitting a laser beam (4) comprising laser pulses having a pulse energy, a pulse width, and a pulse repetition frequency; providing a scanner (2) comprising a first mirror (6) for scanning the laser beam in a first direction (8), and a second mirror (7) for scanning the laser beam in a second direction (9); providing a lens (3) for focussing the laser beam from the laser (2) onto the anodized metal surface (5) to form a spot (31) having a spot diameter and a pulse fluence; providing a controller (11) for controlling the scanner (2) with a control signal (12); marking a plurality of lines (15) separated by a hatch distance (19) on the anodized metal surface to form a desired mark (16) by scanning the scanner (2) while pulsing the laser (1); selecting a scan speed (16), the pulse repetition frequency, and the spot diameter such that the separation (18) between consecutive spots (31) during each scan of the scanner (2) is at least one quarter of the spot diameter; the method being characterized by: over- (Continued)

writing each line (15) more than once; the color being given by the spot to spot separation (18), hatch distance (19), the pulse fluence, the pulse width, and the number of times each line is written; and selecting the spot to spot separation (18), the hatch distance (19), the pulse fluence, the pulse width, and the number of times each line is written to form the desired color.

20 Claims, 3 Drawing Sheets

(51) Int. Cl.
  *B23K 26/06* (2014.01)
  *B41J 3/413* (2006.01)

(52) U.S. Cl.
  CPC ...... *B23K 26/0643* (2013.01); *B23K 26/0648* (2013.01); *B23K 26/082* (2015.10); *B41J 3/413* (2013.01); *B41M 5/262* (2013.01)

(56) References Cited

U.S. PATENT DOCUMENTS

| | | |
|---|---|---|
| 2011/0089067 A1 | 4/2011 | Scott et al. |
| 2011/0193928 A1 | 8/2011 | Zhang |
| 2012/0200656 A1* | 8/2012 | Oda ........................ B41J 2/442 |
| | | 347/225 |

* cited by examiner

METHOD FOR LASER MARKING AN ANODIZED METAL SURFACE WITH A DESIRED COLOUR

FIELD OF INVENTION

This invention relates to a method for laser marking an anodized metal surface with a desired color. The invention has particular application for rapidly marking anodized aluminium consumer goods with high quality black marks without the use of dyes, inks or other chemicals.

BACKGROUND TO THE INVENTION

The use of dyes, inks and other chemicals in the marking of commercial, consumer and industrial goods places restrictions on supply chains, logistics and the environment. Processes that can mark without the use of dyes, inks or other chemicals can therefore provide a distinct advantage. Laser marking is also generally more versatile, reproducible, and can provide marks that have a higher quality and durability than chemical methods such as silk screens.

Laser marking has been applied to many materials including metals. Once perfected for a particular material, the laser marking process is typically reliable, repeatable, and amenable to high-throughput high-yield production. An example is the color marking of anodized aluminium, a material that is in widespread use as it is lightweight, strong, easily shaped, and has a durable surface finish. The anodized surface is generally dyed with colored dyes. However it is also possible to laser mark anodized aluminium without the use of dyes, inks or other chemicals. Laser light can be used directly to form various colors either within the anodization or in the interface region between the oxide layer that forms the anodization and the aluminium. Similar marks can also be made on other anodized metal surfaces such as titanium, zinc, magnesium, niobium and tantalum.

It is very desirable in consumer goods to have a mark that is distinctive in shape, quality and color, and have a high color contrast to the surrounding material. High quality black marks in anodized aluminium are highly desirable and commercially very important.

U.S. Pat. No. 6,777,098 describes a method of marking anodized aluminium articles with black marks which occur in a layer between the anodization and the aluminium and therefore are as durable as the anodized surface. The marks described therein are described as being dark grey or black in hue and somewhat less shiny than unmarked portion using nanosecond range infrared laser pulses. As taught in U.S. Pat. No. 8,451,873, making marks according to the methods claimed in U.S. Pat. No. 6,777,098 are disadvantageous because (i) creating commercially desirable black marks with nanosecond range pulses tends to cause destruction of the oxide layer, and (ii) cleaning of the aluminium following polishing or other processing adds another step in the process, with associated expense, and possibly disturbs a desired surface finish.

U.S. Pat. No. 8,451,873 discloses a method for creating a mark on an anodized specimen. The method involves providing a laser marking system having controllable laser pulse parameters, determining the laser pulse parameters associated with the desired properties, and directing the laser marking system to mark the article using the selected laser pulse parameters. Laser marks so made have an optical density that ranges from transparent to opaque, a white color, a texture indistinguishable from the surrounding article, and durable, substantially intact anodization. The patent teaches that marks created using laser pulses greater than 1 nanosecond results in clear signs of cracking of the anodization. In particular, the patent teaches that when marking with prior art nanosecond pulses, applying enough laser pulse energy to the surface to make dark marks causes damage to the anodization which causes the appearance of the marks to change with viewing angle. The patent also teaches solving this problem by using pulses having pulse widths of approximately 10 ps. Marks produced by using pulses having pulse widths of approximately 10 ps or less do not damage the anodization, regardless of how dark the marks are, and nor do the marks change in appearance with viewing angle. Such marks are typical of so-called "cold processing" that utilize multi-photon absorption effects in the material. Cold processing (such as cold ablation) does not rely on thermal effects to produce the desired processing effect, and therefore has little if any thermal damage surrounding the processed area. Cold processing relies on femtosecond lasers, or picosecond lasers having pulse widths up to around 10 ps to 50 ps. The marks, quantified by the CIE system of colorimetry, have a chromaticity less than L=40, a=5, and b=10. Although the picosecond lasers used in the patent were much less expensive than femtosecond lasers, the picosecond lasers users are more expensive than nanosecond lasers because they rely on very advanced techniques and components such as optical pulse compressors to produce the very narrow laser pulse widths. Moreover, an L value lower than approximately 30 is more commercially important, and for this, the picosecond lasers used do not write the marks quickly enough for many commercial applications where cost is at a premium. It is advantageous not to rely on expensive techniques or components such as optical pulse compression and optical pulse compressors.

The damage to the anodization layers caused by the use of nanosecond lasers is a particular problem. It is believed that this is caused by thermal effects, and heat build up below the anodization layer as consecutive pulses are written.

There is a need for a method for laser marking a metal surface with a desired color that avoids the aforementioned problems.

THE INVENTION

Accordingly, in one non-limiting embodiment of the present invention there is provided a method for laser marking an anodized metal surface with a desired color, which method comprises: providing a laser for emitting a laser beam comprising laser pulses having a pulse energy, a pulse width, and a pulse repetition frequency; providing a scanner comprising a first mirror for scanning the laser beam in a first direction, and a second mirror for scanning the laser beam in a second direction; providing a lens for focussing the laser beam from the laser onto the anodized metal surface to form a spot having a spot diameter and a pulse fluence; providing a controller for controlling the scanner with a control signal; marking a plurality of lines separated by a hatch distance on the anodized metal surface to form a desired mark by scanning the scanner while pulsing the laser; and selecting a scan speed, the pulse repetition frequency, and the spot diameter such that the separation between consecutive spots during each scan of the scanner is at least one quarter of the spot diameter; the method being characterized by overwriting each line more than once, the color being given by the spot to spot separation, the hatch distance, the pulse fluence, the pulse width, and the number of times each line is written; and selecting the spot to spot separation, the hatch distance, the pulse fluence, the pulse width, and the number of times each line is written to form the desired color.

The method of the present invention is particularly attractive because it is able to produce marks on anodized metal surfaces faster, and therefore more economically, than has hitherto been possible. For example, a black mark can be obtained with lines that are written only once, with spot to spot separations of approximately 10 µm and line to line spacings (hatching) of approximately 0.2 µm. Considerable time will be spent between scans when using a typical scanner with a "digital" resolution of 2 µm as a relatively complicated waveform needs to be derived to control the scanner to achieve a sub-digital resolution of 0.2 µm. Surprisingly, however, with the method of the present invention, significant increases in processing speeds can be achieved by stepping the scanner by approximately 2 µm (its digital resolution), and overwriting the lines ten times (equal to the quotient of 2 µm and 0.2 µm). Not only is the processing speed increased, marks made on anodized aluminium are darker. This is surprising because it would not have been expected that darker marks could be made more quickly by overwriting lines than by making the same number of passes with each pass incremented with respect to the previous pass.

Each line may be written by scanning the first mirror while holding the second mirror stationary. Other ways of writing the lines may be employed, for example the angular position of the second mirror can be incremented in proportion to the angular position of the first mirror. However this is not preferred.

The hatch distance may be achieved by moving the second mirror.

The second mirror may be characterized by a digital resolution, and the hatch distance may correspond to an integral multiple of the digital resolution.

The metal may be a precipitation hardened aluminium alloy. Other metals may be employed, for example anodized titanium, zinc, magnesium, niobium and tantalum.

The metal may have been glass bead blasted.

The metal may have been hard anodized.

The anodization may have a thickness between 5 µm and 25 µm. The thickness may be between 5 µm and 15 µm.

The anodization may be clear. Alternatively or additionally, the anodization may be colored.

The color may be any suitable color, for example black or gray. When the color is black, then a black mark that can be written rapidly onto consumer goods having near perfect finishes. This is commercially very important and indeed it can make the difference between the mark being commercially viable or non-viable.

The color may be gray or black with an L value no greater than 40. Preferably the L value is no greater than 30. A mark with an L value no greater than 30 would generally be considered to be a black mark.

The laser may be a pulsed laser providing a laser beam having a pulse width greater than one hundred picoseconds. The pulse width may be greater than 1 nanosecond. It is highly significant that high quality black marks (L<=30) can be made rapidly, and with nanosecond pulsed lasers as opposed to picosecond pulsed lasers. This is because nanosecond pulsed lasers are by their very nature lower cost than picosecond pulsed lasers, and are much lower cost than femtosecond and picosecond pulsed lasers that have pulse widths less than approximately 50 ps and are which marketed for cold laser processing applications such as cold ablation.

The scanner may be accelerated prior to pulsing the laser. This step reduces edge effects by ensuring that the scanner is already moving at its desired speed when the laser is first turned on during each scan.

The anodized metal surface may be orientated to minimize the overall time taken to form the mark. This feature may be employed where it is desired to further reduce the time taken to produce the mark. The time taken is related to the overall distance by the scanning speed, and the time to decelerate the scanner at the end of the line, and accelerate the scanner at the beginning of the line.

The scanning speed may be at least 5 m/s.

The pulse repetition frequency may be at least 500 kHz.

The scanning speed may be at least 9 m/s, and the pulse repetition frequency may be at least 900 kHz. This combination of scanning speed and pulse repetition frequency is equivalent to a spot to spot separation of 10 µm. This is typically around half the $1/e^2$ diameter of the focussed laser beam (ie the spot) on the surface of the anodized metal.

Each line may be overwritten a plurality of times. Preferably, each line is written at least 5 times, but more or less times may be employed. Although it is possible to scan each line only once with the same pulse repetition frequency, it has been found that thermal damage can occur in the anodized material. It is therefore preferred to write each line as rapidly as possible in order to minimize thermal damage and thus optimize the quality of the mark.

The spot to spot separation may be at least half the spot diameter.

The present invention also provides an article when marked according to the method of the invention. Examples of articles are mobile phones, tablet computers, televisions, machinery, and jewellery.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figures 1, 2, 3, 4:
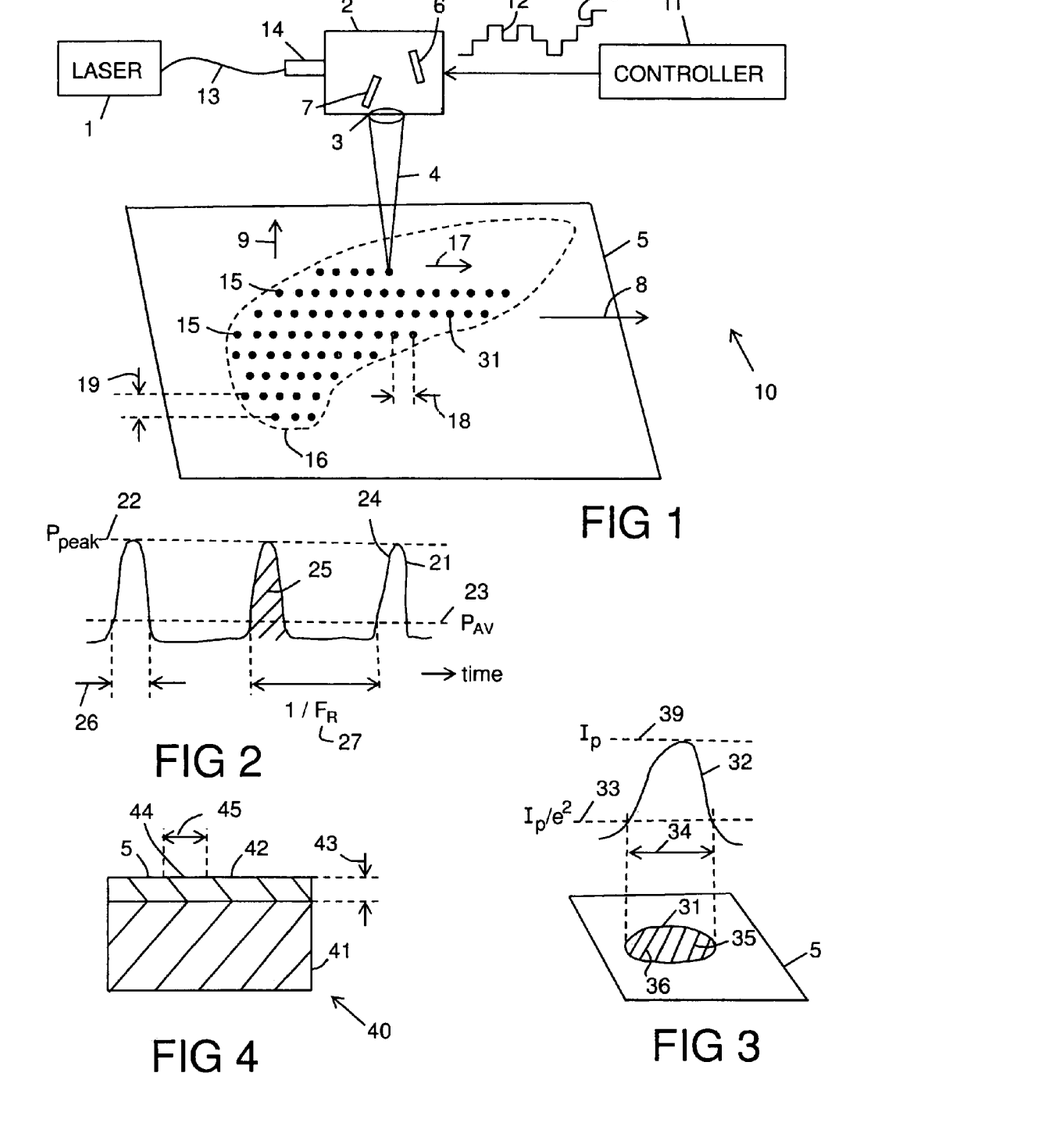
FIG. 1 shows apparatus for use in the method according to the present invention.
FIG. 2 shows a pulsed laser waveform.
FIG. 3 shows a laser beam that has been focussed onto a surface.
FIG. 4 shows a sample comprising a metal substrate and an anodized surface.

FIG. 1 shows a laser based marking machine 10 comprising a laser 1, a scanner 2, and an objective lens 3. The scanner 2 moves a laser beam 4 with respect to an anodized metal surface 5. The scanner 2 comprises a first mirror 6 for moving the laser beam 4 in a first direction 8, and a second mirror 7 for scanning the laser beam 4 in a second direction 9. The scanner 2 is controlled by a controller 11 which controls the positions of the first and second mirrors 6, 7 by providing at least one control signal 12 to the scanner 2. The controller 11 may also control the laser 1. The first and the second mirrors 6, 7 would typically be attached to galvanometers (not shown).

The laser 1 can be a fibre laser, a solid state rod laser, a solid state disk laser, or a gas laser such as a carbon dioxide laser. For marking anodized metal surfaces, the laser 1 is preferably a pulsed laser. The laser 1 is shown as being connected to the scanner 2 via an optical fibre cable 13 and collimation optics 14.

The control signal 12 is depicted as a digital control signal with finite resolution, which would typically be converted into an analogue signal either in the controller 11 or the scanner 2 using a digital to analogue converter. If the digital control signal is incremented slowly, that is, at time increments similar to or larger than the electrical and mechanical time constants in the scanner 2, then the finite resolution corresponds to finite angular resolution in the positions of the first and second mirrors 6, 7, and therefore finite spatial resolution in the position of the laser beam 4 on the surface 5. By filtering the control signal 12, either electronically, or by means of the inertia of the scanner 2 (for example the inertia of the first and second mirrors 6, 7 and associated galvanometers), improved angular resolution can typically be achieved in the scanner 2. This corresponds to improved spatial resolution in the position of the laser beam 4 on the anodized metal surface 5.

Referring now to FIG. 2, there is shown a series of pulses 21. The series of pulses 21 may be obtained from the laser 1 wherein the laser 1 is a pulsed laser. The series of pulses 21 is characterized by a peak power 22, an average power 23, a pulse shape 24, a pulse energy 25, a pulse width 26, and a pulse repetition frequency $F_R$ 27.

FIG. 3 shows a spot 31 formed by focussing the laser beam 4 onto the anodized metal surface 5. The optical intensity 32 is the power per unit area of the laser beam 4. The optical intensity 32 varies across the diameter of the spot 31 from a peak intensity 39 to a $1/e^2$ intensity 33 and to zero. The diameter of the spot 31 is typically taken as the $1/e^2$ diameter 34, which is the diameter at which the optical intensity 32 falls to the $1/e^2$ intensity 33 on either side of the peak intensity 39. The area 35 of the spot 31 is typically taken as the cross-sectional area of the spot 31 within the $1/e^2$ diameter 34. FIG. 3 shows the optical intensity 32 varying with a Gaussian or bell-shaped profile. The optical intensity 32 may have other profiles, including a top hat profile that is substantially uniform within the beam diameter.

Pulse fluence 36 is defined as the energy per unit area of the pulse 21. Pulse fluence is typically measured in $J/cm^2$, and is an important parameter for laser marking because a mark is typically formed when the pulse fluence 36 is greater than a pulse fluence threshold 82 of a material shown with reference to FIG. 8.

A method according to the invention and for laser marking the anodized metal surface 5 with a desired color will now be described solely by way of example and with reference to FIG. 1. The method comprises:
  providing the laser 1 for emitting the laser beam 4 comprising the laser pulses 21 having the pulse energy 25, the pulse width 26, and the pulse repetition frequency 27 shown with reference to FIG. 2;
  providing the scanner 2, which comprises the first mirror 6 for scanning the laser beam 4 in the first direction 8, and the second mirror 7 for scanning the laser beam 4 in the second direction 9;
  providing the lens 3 for focussing the laser beam 4 from the laser 4 onto the anodized metal surface 5 to form the spot 31 having the spot diameter 34 and the pulse fluence 36 shown with reference to FIG. 3;
  providing the controller 11 for controlling the scanner 2 with the control signal 12;
  marking a plurality of lines 15 separated by a hatch distance 19 on the anodized metal surface 5 to form a desired mark 16 (shown in outline) by scanning the scanner 2 with a scan speed 17 while pulsing the laser 1; and
  selecting the scan speed 17, the pulse repetition frequency 27, and the spot diameter 34 such that the separation 18 between consecutive spots 31 during each scan of the scanner 2 is at least one quarter of the spot diameter 34.

The method is characterized by:
  overwriting each line 15 more than once;
  the color of the mark 16 being given by the spot to spot separation 18, the hatch distance 19, the pulse fluence 36, the pulse width 26, and the number of times each line 15 is written; and
  selecting the spot to spot separation 18, the hatch distance 19, the pulse fluence 36, the pulse width 26, and the number of times each line 15 is written, to form the desired color.

By "spot to spot separation" 18, it is meant the distance from the centres of adjacent spots 31 as each line 15 is written once. The separation 18 may be uniform, or may vary. The separation 18 may be the same in different directions. The separation 18 may be different in different directions.

The pulse fluence is typically in the range 0.02 $J/cm^2$ to 10 $J/cm^2$. Preferably the pulse fluence is in the range 0.3 $J/cm^2$ to 5 $J/cm^2$. More preferably the pulse fluence is in the range 0.5 $J/cm^2$ to 2 $J/cm^2$.

The pulse width is typically in the range 00 ps to 25 ns. Preferably the pulse width is in the range 300 ps to 10 ns. More preferably the pulsed width is in the range 500 ps to 5 ns. By pulse width, it is meant the full width half maximum duration of the pulse.

The peak power is preferably greater than 1 kW. By peak power, it is meant the maximum power level during the duration of the pulse.

The scanning speed is typically in the range 2 to 25 m/s. Preferably the scanning speed is in the range 5 to 15 m/s. More preferably the scanning speed is the range 7 to 10 m/s.

Preferably, each line 15 is written by scanning the first mirror 6 while holding the second mirror 7 stationary. Also preferably, the hatch distance 19 is achieved by moving the second mirror 7. This is advantageous because it reduces delays in setting up the control parameters in the controller 11.

The second mirror 7 may be characterized by a digital resolution 101 shown with reference to FIG. 1. Preferably the hatch distance 19 corresponds to an integral multiple of the digital resolution 101. For example, a typical scanner may have a digital resolution 101 corresponding to a hatch distance 19 of 2 μm (typically the product of the angular digital resolution measured in radians and the focal length of the lens 3). Instead of writing ten individual lines 15 with a hatch distance 19 of 0.2 μm, it has been discovered that marks of the same or similar quality can be written by writing each line 15 ten times using a hatch distance 19 of 2 μm. Not only is this surprising, but it provides a means of significantly reducing the time taken to mark an object. This is because of the removal of superfluous timing delays as the first scanning mirror 6 scans over the same path. The proportion of time taken for typical controllers to increment the hatch distance 19 between successive lines 15 can be significant, particularly when demanding sub-digital resolution.

The method of the present invention as described above with reference to FIGS. 1-3 is particularly attractive because it is able to produce marks on anodized metal surfaces faster, and therefore, more economically than has hitherto been possible. For example, a black mark could be obtained with lines that are written only once, with spot to spot separations of approximately 10 µm and a hatch distance 19 of approximately 0.2 µm. However, considerable time will be spent between scans when using a typical scanner with a digital resolution 12 corresponding to 2 µm as a relatively complicated waveform needs to be derived to control the scanner to achieve a sub-digital resolution 12 of 0.2 µm. Surprisingly, however, the method of the present invention is able to achieve significant increases in processing speeds by stepping the scanner by 2 µm (its digital resolution), and overwriting the lines ten times (equal to the quotient of 2 µm and 0.2 µm). Also surprisingly, the method of the present invention is able to provide better uniformity as seen by the naked eye of the mark by overwriting each line than by writing each line only once with a smaller hatch distance 19.

Referring now to FIG. 4, there is shown a cross section of a product sample 40 containing the anodized metal surface 5. The sample 40 comprises a metal 41 and an anodization 42. The metal 41 may be a precipitation hardened aluminium alloy. Precipitation hardened aluminium alloys can be procured from Aalco Metals Ltd of Cobham, Surrey, United Kingdom. The metal 41 may have been glass bead blasted. Glass bead blasting can be procured from Sandwell UK Ltd of Towcester, United Kingdom. The metal 41 may have been hard anodized to produce the anodization 42. The hard anodization may have a thickness of between 5 um and 25 um. More preferably the thickness is between 10 um and 15 um. Hard anodization processing can be procured from Hard Anodising Ltd of Kidderminster, United Kingdom. The anodization 42 may be clear. By "clear" it is meant "transparent". The clear anodization may be colorless or may be colored. Alternatively, the anodization 42 may be translucent or opaque, and in each case, either colorless or colored. The color can be provided by a dye that is incorporated into the anodization 42.

The color of the mark 16 may be grey or black. The color may have an L value less than or equal to 40. Preferably the L value is no greater than 30. A mark having an L value less than or equal to 30 is generally considered to be a black mark. A black mark having near perfect finishes that can be written rapidly onto consumer goods is commercially very important. Indeed the speed of writing and the quality of the mark 16 can make the difference between the mark 16, and the apparatus 10 for making the mark 16, being commercially viable or non-viable.

The laser 1 may be a pulsed laser having a pulse width greater than one hundred picoseconds. The pulse width may be greater than 1 nanosecond. It is surprising and highly commercially significant that high quality black marks can be made rapidly, and with nanosecond pulsed lasers as opposed to picosecond pulsed lasers that have pulse widths less than approximately 10 ps to 50 ps. This is because nanosecond pulsed lasers are by their very nature lower cost than picosecond lasers, and are much lower cost than femtosecond and picosecond pulsed lasers that have pulse widths less than approximately 50 ps and are which marketed for cold laser processing applications such as cold ablation. Such lasers rely on pulse compression techniques or incorporate pulse compressors. It is preferred that the laser 1 does not include a pulse compressor.

The laser 1 may be an optical fibre laser having a single mode or a multi mode rare-earth doped fibre. The beam quality may correspond to an $M^2$ less than 2, or preferably less than 1.3.

Figure 7:
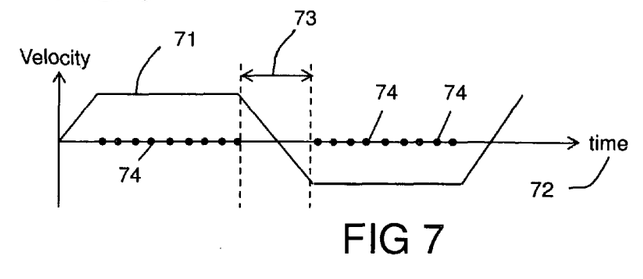
FIG. 7 shows the scanning velocity decelerating and accelerating between marks.

The scanner 2 may be accelerated prior to pulsing the laser 1 as shown with reference to FIG. 7. This step reduces edge effects on the mark 16 by ensuring that the scanner 2 is already moving at its desired speed 17 when the laser 1 is first turned on during each scan.

Figure 5:
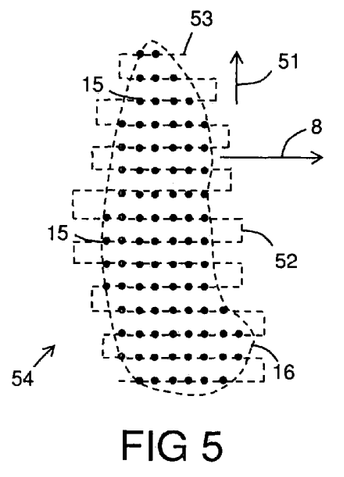
FIGS. 5 and 6 shows a mark being made with different orientations of the mark with the first scanning direction.
Figure 6:
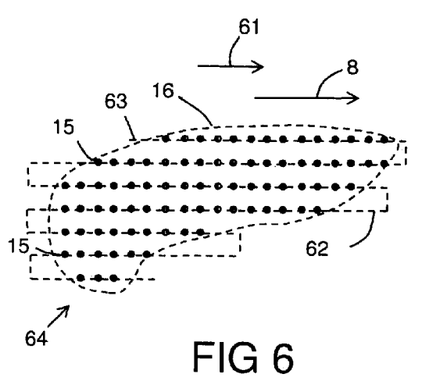

As shown with reference to FIGS. 5 to 7, the anodized metal surface 5 may be orientated to minimize the overall time taken to form the mark 16. The mark 16 is orientated in direction 51 in FIG. 5, marked along trajectory 52 that has a total length 53 and a total number 54 of lines 15. The mark 16 is orientated in direction 61 in FIG. 6, marked along trajectory 62 that has a total length 63 and a total number 64 of lines 15. FIG. 7 shows the velocity 71 of the scanning beam 4 with time 72 as it marks the surface 5. The laser 1 is pulsed while the scanning velocity 71 is approximately constant as shown by the pulses 74. The time 73 is the time taken to decelerate the scan and accelerate the scan in the opposite direction. It is clear from examining FIGS. 5 and 6 that the total number 54 of lines 15 achieved with orientation 53 is much larger than the total number 64 of lines 15 in FIG. 6 with the orientation 61. The orientation 61 that minimizes the overall time taken to form the mark 16 can be estimated from the total number 54, 64 of lines 15 required to make the mark 16, the scan speed 17, and the time taken 73 at the end of each line 15 to reverse direction and commence scanning again. This feature is advantageous where it is required to further reduce the overall time taken to produce the mark 16. The overall time taken to produce the mark 16 is related to the overall distance 53, 63 by the scanning speed 17 and the time 73 required to accelerate and decelerate at the beginning and end of each line 15. The lines 15 can each be scanned a plurality of times.

The scan speed 17 may be at least 5 m/s. By "at least" it is meant equal to or greater than.

The pulse repetition frequency 27 may be at least 500 kHz.

The scan speed 17 may be at least 9 m/s, and the pulse repetition frequency 27 may be at least 900 kHz. Such a combination of scan speed 17 and pulse repetition frequency 27 is equivalent to a spot to spot separation 18 of 10 µm. This is typically around half the $1/e^2$ diameter of the focussed laser beam (ie the spot 31) that is readily achievable on the anodized metal surface 5 when using a single-mode pulsed fibre laser.

Each line 15 is preferably overwritten at least 5 times. Although it is possible to scan each line 15 only once with the same pulse repetition frequency 27, it has been found that thermal damage can occur in the anodized material 5. Preferably each line 15 is scanned as rapidly as possible in order to minimize thermal damage and thus optimize the quality of the mark.

Figure 8:
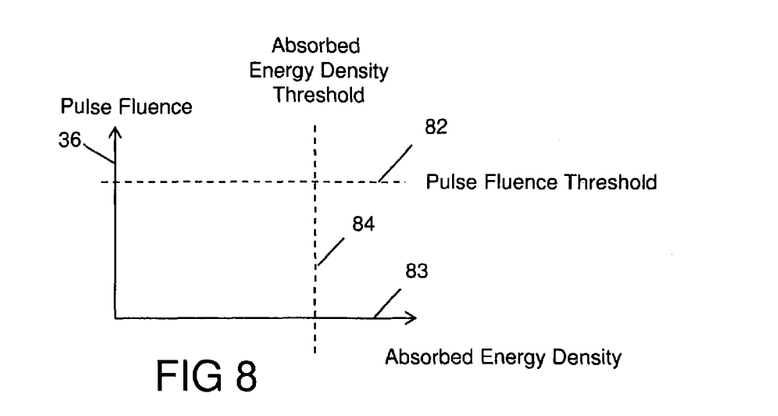
FIG. 8 shows a graph of pulse fluence versus absorbed energy density.

The spot to spot separation 18 may be at least half the spot diameter 34. FIG. 8 shows the pulse fluence 36 versus absorbed energy density 83. As described with reference to FIG. 3, the mark 16 is formed when the pulse fluence 36 is greater than the pulse fluence threshold 82. However when forming the mark 16, the individual pulses heat up the anodized metal surface 5. When the absorbed energy density 83 exceeds an absorbed energy density threshold 84, the anodization 42 (shown with reference to FIG. 4) cracks or shatters. Such cracks or shattering is undesirable when forming a mark 16 of high quality. It is therefore preferred that the marking process achieves a pulse fluence 36 greater than the pulse fluence threshold 82, but that the absorbed energy density 83 is less than the absorbed energy density threshold 84 of the product sample 40.

By absorbed energy density 83, it is meant the absorbed energy density on the surface 5 that is absorbed and retained in a circular area 44 having a circumference 45 approximately one to five times the thickness 43 of the anodization 42 shown with reference to FIG. 4. The absorbed energy density 83 will increase following every pulse delivered in the region of the circular area 44, but will decrease with heat flow out of the circular area 44, either laterally along the surface 5, or through into the metal 41.

Without wishing to limit the scope of the invention, it is believed that repeated writing of the lines 15 is advantageous because it permits time for heat flow out of the circular area 44 between the time each line 15 is written. For example, a darker mark 16 that is of higher quality (less cracking or shattering of the anodization 42) can be produced by writing each line 15 five times than by writing a mark with each line 15 written only once with a scan speed 17 five times more slowly. In this comparison, the other parameters are held constant, ie both marks are written with the same peak power 22, average power 23, pulse shape 24, pulse energy 25, pulse width 26, pulse repetition frequency 27 and pulse fluence 36.

Figure 9:
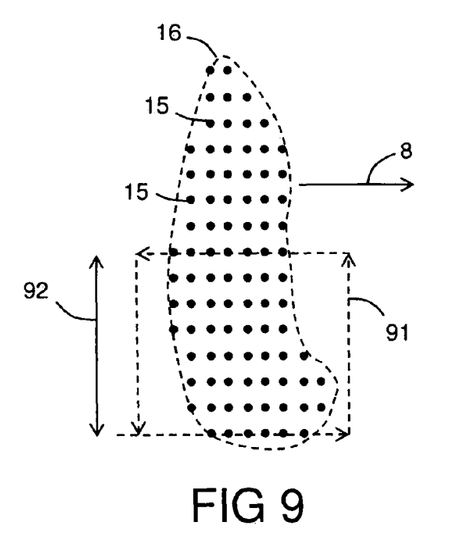
FIGS. 9 and 10 show the interlacing of line marking.
Figure 10:
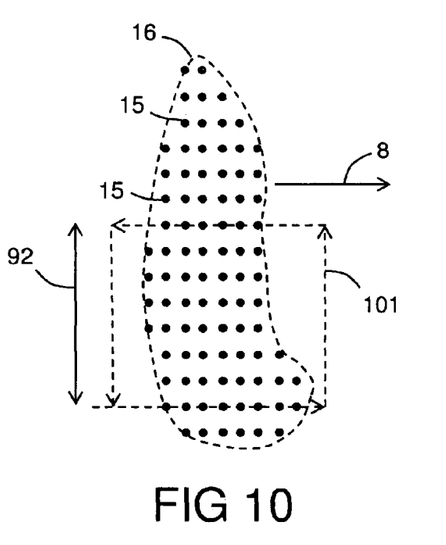

Although the method of the invention includes the step of writing each line 15 more than once, the writing of different ones of the lines 15 can be interlaced by, for example, following a path 91 shown in FIG. 9 where the direction of the scanning is indicated by the arrows. The distance 92 between the lines 15 that are being written is preferably greater than the thickness 43 of the anodization 43, and more preferably greater than five times the thickness 43 of the anodization 43. Once the lines 15 are written, the scanning path 91 can be incremented as shown in FIG. 10 to a new scanning path 101 in which the lines 15 can be adjacent to those written previously (as shown in FIG. 10), or non-adjacent. The advantage of such an approach is that it gives more time for heat energy to dissipate while each line 15 is being written, and thus the absorbed energy density 83 is reduced. This reduces the risk of cracking or shattering of the anodization 43, or alternatively, permits the scanning speed 17 to be increased. This interlacing approach can be modified by writing in multiple zig zags, by varying which line 15 is being written on a random or pseudo random basis, or by other writing patterns that achieve interlacing during the repeated scanning of each line 15.

Referring again to FIG. 7, the laser 1 can be pulsed during the time 73 at a pulse fluence 36 that is less than the pulse fluence threshold 82 of the sample 40. The advantage of so doing is to reduce the thermal gradient at the edges of the mark 16. Preferably the pulse fluence 36 during the time 73 is at least five times less than the pulse fluence threshold 82.

The method described above may be used to mark a wide variety of articles including, for example, mobile phones, tablet computers, televisions, machinery, and jewellery.

The method of the invention will now be described with reference to the following non-limiting example, which is given for illustrative purposes only.

EXAMPLE

The laser 1 shown with reference to FIG. 1 was a pulsed fibre laser model number SP-020P-A-EP-S-A-Y, manufactured by SPI Lasers UK Ltd of Southampton, England. The scanner 2 was a galvanometric scan-head model SuperScan II, manufactured by Raylase GmbH of Wessling Germany. The objective lens 3 was a 163 mm focal length f-theta objective lens. The laser beam 4 was delivered from the laser 1 to the scanner 2 via a 75 mm beam expanding collimator (BEC) 14 which enabled the laser beam 4 to have a nominal diameter of 8 mm ($1/e^2$) at the entrance to the scanner 2, and a spot diameter 36 of 34 µm+/−5.0 µm to be generated at the focal plane of the scanner objective lens 3. During normal operation of the workstation 10, the anodized metal surface 5 was placed at or near to this focal plane.

The laser 1 was capable of generating pulses in the nanosecond duration range (between approximately 3 ns to approximately 500 ns) and was operated over a range of average output power, laser pulse frequency and temporal pulse shape (which is referred to as a waveform for this type of laser). In this way the pulse energy 25 and pulse peak power 22 were able to be accurately controlled. The scanner 2 was able to scan the laser beam 4 with a scan speed 17 of up to 10 m/s (for the specified focal length of scanner objective lens 3 used in this case). The scan speed 17 was able to be accurately controlled so that when the laser 1 was operating at a known pulse repetition frequency 27, the number of laser pulses per unit length of movement could be calculated.

The anodized metal surface 5 was the topside of a sample of precipitation hardened aluminium alloy that had been glass bead blasted and hard anodized. The hard anodization had a thickness 43 of approximately 10 µm.

The method of the invention is able to produce black marks without the characteristic shattering experienced with prior nanosecond laser marking.

Similar experiments have been performed on other anodized metal surfaces. These experiments have demonstrated the quality and blackness of the marks, and the improvement in writing the mark according to the method of the invention.

It is to be appreciated that the embodiments of the invention described above with reference to the accompanying drawings have been given by way of example only and that modifications and additional steps and components may be provided to enhance performance. Individual components shown in the drawings are not limited to use in their drawings and may be used in other drawings and in all aspects of the invention. The present invention extends to the above mentioned features taken singly or in any combination.

The invention claimed is:

1. A method for laser marking an anodized metal surface with a desired colour, which method comprises:
   providing a laser for emitting a laser beam comprising laser pulses having a pulse energy, a pulse width, and a pulse repetition frequency;
   providing a seamier comprising a first mirror for scanning the laser beam in a first direction, and a second mirror for scanning the laser beam in a second direction;
   providing a lens for focussing the laser beam from the laser onto the anodized metal surface to form a spot having a spot diameter and a pulse fluence;
   providing a controller for controlling the scanner with a control signal;
   marking a plurality of lines separated by a hatch distance on the anodized metal surface to form a desired mark by scanning the scanner while pulsing the laser; and
   selecting a scan speed, the pulse repetition frequency, and the spot diameter such that the separation between consecutive spots during each scan of the scanner is at least one quarter of the spot diameter;

the method being characterized by
overwriting each line more than once;
the colour being given by the spot to spot separation, the hatch distance, the pulse fluence, the pulse width, and the number of times each line is written; and
selecting the spot to spot separation, the hatch distance, the pulse fluence, the pulse width, and the number of times each line is written to form the desired colour.

2. A method according to claim 1 wherein the second mirror is characterised by a digital resolution, and the hatch distance corresponds to an integral multiple of the digital resolution.

3. A method according to claim 1 wherein the metal is a precipitation hardened aluminium alloy.

4. A method according to claim 1 wherein the metal has been glass bead blasted.

5. A method according to claim 1 wherein the metal has been hard anodized.

6. A method according to claim 1 wherein the anodization has a thickness between 5 µm and 25 µm.

7. A method according to claim 6 wherein the anodization has a thickness between 5 µm and 15 µm.

8. A method according to claim 1 wherein the anodization is clear.

9. A method according to claim 1 wherein the anodization is coloured.

10. A method according to claim 1 wherein the colour is gray or black with an L value no greater than 40.

11. A method according to claim 10 wherein the L value is no greater than 30.

12. A method according to claim 1 wherein the laser is a pulsed laser providing a laser beam having a pulse width greater than one hundred picoseconds.

13. A method according to claim 12 wherein the pulse width is greater than 1 nanosecond.

14. A method according to claim 1 wherein the scanner is accelerated prior to pulsing the laser.

15. A method according to claim 1 wherein the anodized metal surface is orientated to minimize the overall time taken to form the mark.

16. A method according to claim 1 wherein the scanning speed is at least 5 m/s.

17. A method according to claim 1 wherein the pulse repetition frequency is at least 500 kHz.

18. A method according to claim 1 wherein the scanning speed is at least 9 m/s, and the pulse repetition frequency is at least 900 kHz.

19. A method according to claim 1 wherein each line is overwritten at least 5 times.

20. A method according to claim 1 wherein the spot to spot separation is at least half the spot diameter.

* * * * *